United States Patent [19]
Dillman

[11] Patent Number: 5,427,497
[45] Date of Patent: Jun. 27, 1995

[54] HORIZONTAL SURGE/STORAGE SILO

[76] Inventor: Bruce A. Dillman, 1929 SE. 40th Ter., #4, Cape Coral, Fla. 33904

[21] Appl. No.: 137,601

[22] Filed: Oct. 15, 1993

[51] Int. Cl.⁶ .............................................. B65D 19/00
[52] U.S. Cl. ................................. 414/537; 62/457.1; 220/1.5; 296/181; 296/61; 296/216; 414/373; 414/786; 414/390; 414/919; 432/62
[58] Field of Search ............... 414/537, 786, 137.1, 414/137.9, 538, 139.4, 142.8, 142.9, 458, 403, 287, 288, 332, 919, 339, 352, 373, 395, 390, 481, 572, 585, 495, 476, 392; 220/1.5; 296/1.1, 15, 27.1, 181, 182, 216, 183, 57.1, 61; 432/62; 2/457.1

[56] References Cited

U.S. PATENT DOCUMENTS

| | | | |
|---|---|---|---|
| 3,759,405 | 9/1973 | Barry | 414/373 |
| 4,373,857 | 2/1983 | Giles | 414/481 X |
| 4,535,933 | 8/1985 | Kuiper | 296/181 X |
| 4,570,959 | 2/1986 | Grinwqld | 414/458 X |
| 4,854,460 | 8/1989 | Josephs | 220/1.5 |
| 4,958,977 | 9/1990 | Snead | 414/339 |
| 5,190,341 | 3/1993 | Simard | 296/181 X |
| 5,297,914 | 3/1994 | Ash | 414/390 X |

FOREIGN PATENT DOCUMENTS

| | | | |
|---|---|---|---|
| 690109 | 9/1930 | France | 296/1.1 |
| 2518965 | 7/1983 | France | 296/1.1 |
| 513598 | 10/1939 | United Kingdom | 414/537 |

Primary Examiner—Frank E. Werner
Attorney, Agent, or Firm—Wallenstein & Wagner, Ltd.

[57] ABSTRACT

A portable, easily-transported and erected horizontal surge/storage silo functions by the method of allowing large, long distance trucks to dump their contents of materials to be used at a nearby point of use onto the base of the portable silo from which the materials may be subsequently restacked and reloaded by suitable materials-handling devices, such as front-end loaders, onto other smaller vehicles for subsequent transport to the point of use or disposal. A base is sufficiently strong and configured to support upstanding sides and a roof if a roof is desired to provide a totally closed or sealable unit. Where provided, the roof may be removable and the sides may have a fast-closing entrance and door for easy access and safe and protected storage. The structure may have a retractable set of wheel devices affixed thereto so that it may be moved into and out of ground engaging position to make the unit respectively portable and operational. Suitable hydraulics may be provided to lift the unit to allow the wheels to be raised and/or to provide a leveling effect while it is on the ground.

14 Claims, 2 Drawing Sheets

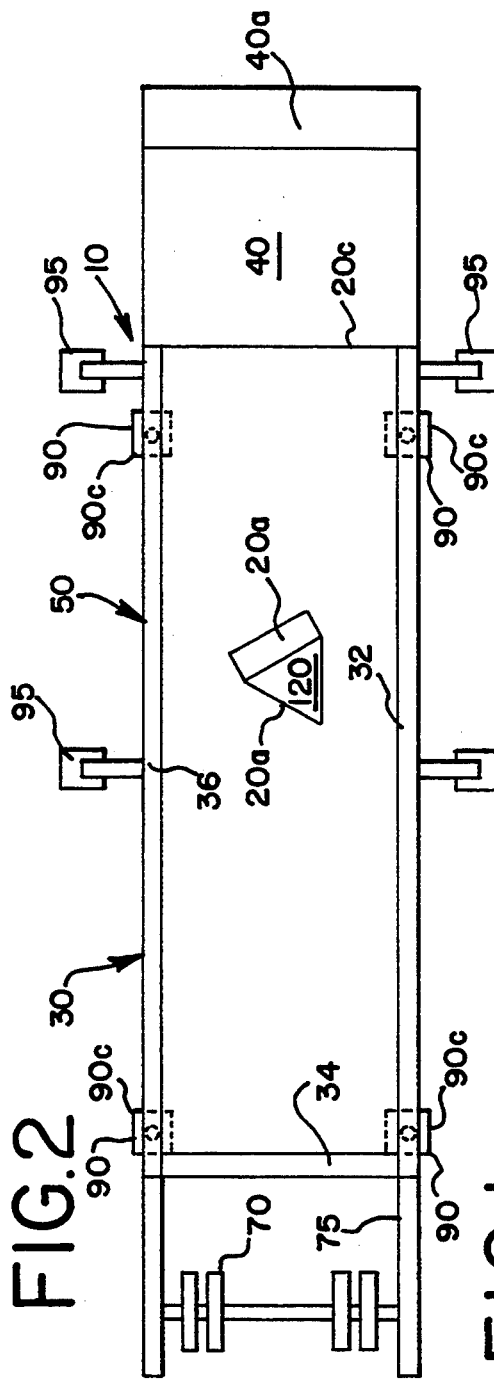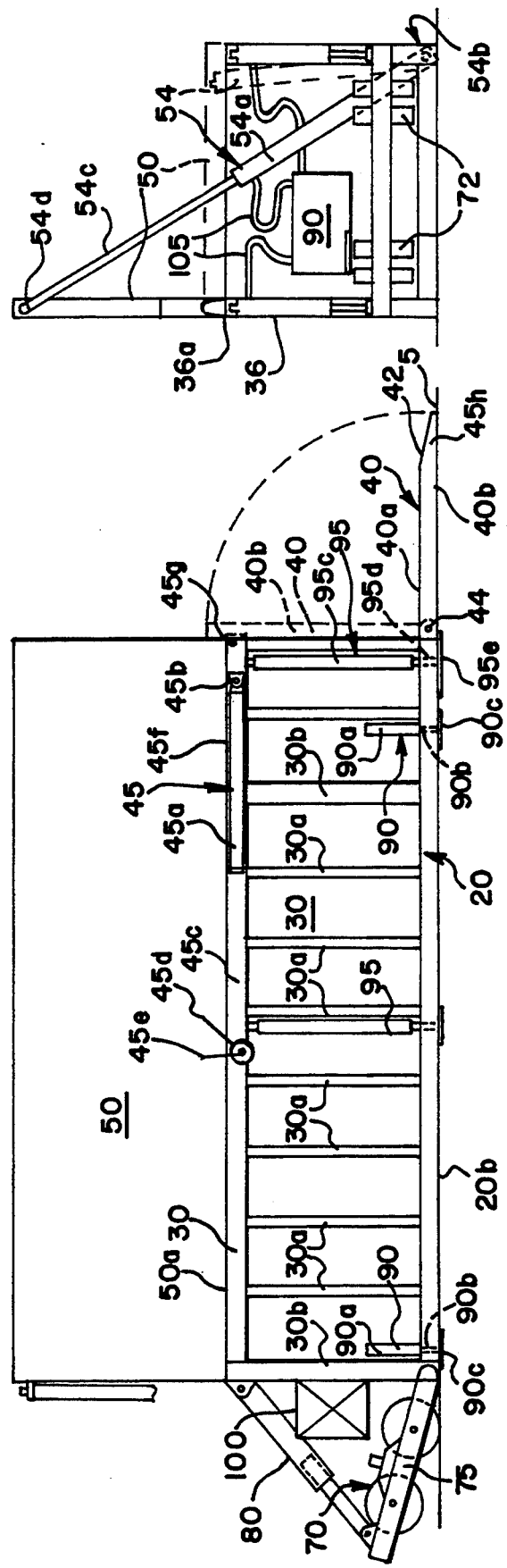

HORIZONTAL SURGE/STORAGE SILO

DESCRIPTION

1. Technical Field of the Invention

The present invention relates to a portable, easily-transported and erected high capacity horizontal surge/storage silo material handling system that includes a material-holding structure having a flat base means with an appropriate enclosure means and including suitable integral wheel and hydraulic means allowing it to be moved with only a tractor means to a local site and lowered into ground engaging position whereat it functions as an inexpensive yet convenient and practical means to receive a wide range of material from a remote location, organize it, securely store it and allow its subsequent use or distribution to a second local location.

2. Background of the Invention

In the prior art relating to integral portable systems for the storage and handling of materials such as paving asphalt, it is known, as shown in my prior U.S. Pat. Nos. 4,465,420 and 4,561,821 to provide a vertical silo and a vertical material conveyor system integrated with a flat-bed trailer structure which may be towed to a site and erected by suitable means such as integral hydraulics. These are highly capital-intensive structures that are difficult and expensive to maintain and operate at remote sites. Not only do they include expensive and complicated hydraulics, but the means for vertically conveying the material has been found, in our experience, to be a maintenance headache which, for example, can close down a job until parts are found and repairs made.

Other approaches at simplifying the handling of material which might reduce the prior art high capital, maintenance and operating cost include the "pallet frame" idea of using a trailer to haul a non-integral structure such as an asphalt plant or storage facility to a site at which point hydraulics on the structure are used to engage the ground and raise it above the trailer so that the carrying trailer may be removed. See, for example, U.S. Pat. No. 3,710,966 showing asphalt bins; U.S. Pat. No. 4,187,047 showing a vertical silo with a conveyor hauled on a single trailer; U.S. Pat. No. 4,053,072 showing closed containers of a general nature; U.S. Pat No. 4,147,262 showing a bin-type structure; U.S. Pat. No. 4,076,299, disclosing a detachable truck bed; and U.S. Pat. No. 4,568,236, directed to a means for loading high tonnage loads. All include hydraulic devices for maintaining the separable structure in a position off the ground and none show or suggest the storage/surge function or structure of a portable device adapted to rest on the ground and accommodate materials and equipment for storage and rehandling of the materials.

A pure flat-bed trailer for moving equipment or cattle is shown in U.S. Pat. No. 3,633,776, wherein the trailer has wheels at one end that may be lowered and raised to bring the trailer into ground engaging position for loading and unloading the equipment or cattle. That patent contemplates the functions of hauling equipment or cattle and facilitating its loading and unloading.

With regard to waste type products, common skid mounted garbage containers, or "dumpsters," as they are sometimes called, are a different kind of structure functioning in a different manner to produce a different result and are not similar or relevant to the present invention.

SUMMARY OF THE INVENTION

The present invention overcomes the above-mentioned disadvantages of the prior art by providing a portable, easily-transported and erected high capacity horizontal surge/storage silo which functions in one use such as with asphalt materials to allow large, long distance hauling trucks to back up and dump their contents into the portable silo from which the materials may be restacked and/or reloaded by separate material handling means, such as front-end loaders, onto other or smaller vehicles for subsequent use or disposal. In another use such as with garbage, the horizontal silo functions by allowing smaller vehicles such as, for example, smaller "dumpster" carriers, to deposit their contents in the silo for either temporary storage and subsequent reloading to larger capacity vehicles and/or movement of the entire silo to the waste deposit site for unloading.

The structure has a ground engaging base means of a size and configuration as for example, 10-14 feet wide, that will accommodate a large over-the-road truck as well as material handling equipment such as a front-end loader. The lower, or bottom, surface of the base means is adapted to rest on the ground and the top or upper surface of the base means is adapted to receive the material. The upper surface is configured to facilitate material handling. The base means is sufficiently strong and configured to support generally peripherally positioned upstanding side portions and a roof as desired to provide a totally closed and effectively sealable unit. An access door means is provided in the side portion for quick and easy access while maintaining safe and protected storage. In embodiments where access to the contents is to be carefully controlled, the door means may be fast closing.

In the preferred embodiment, the structure takes the form of an integral over-the-road trailer-type structure including a flat material receiving portion or base means having a retractable wheel means affixed adjacent one end of the base means whereby when the wheel mean are retracted, the base means is in its ground-engaging operational position and when the wheels are not retracted, the horizontal silo structure may be easily movable from one location to another by a suitable means such as a tractor. Hydraulic units may be used to lift or hold the structure as the wheel means are raised or lowered and/or to provide a leveling effect while it is adjusted to the terrain. This structure overcomes the disadvantages of the known vertical silos in that it eliminates additional expensive and maintenance-intensive moving machinery such as conveyor loaders and requires essentially no installation, i.e., no footings are required, no electric or other utility hook-ups are required and the unit may be made operational in minutes. It may also avoid zoning restrictions when used on a temporary basis, but yet provide a very convenient and practical means for handling materials such as, for example, asphalt and refuse.

One of the many significant advantages of the horizontally disposed silo is that the mechanical conveyor for loading materials into the top of the vertical silo is totally eliminated. In our experience, the elimination of the conveyor loading device reduces the primary acquisition cost of the parts in the order of at least 60 percent, but more importantly, reduces the maintenance cost in the order of approximately 90 percent because the vertical conveyor is a very high-maintenance item. As will be understood by those in the industry, the reduction in required capital and maintenance greatly reduces a user's costs and labor. The simple inventive concept is adaptable to a variety of applications, including, but not limited to, the asphalt industry and the waste management industry.

In the asphalt industry, the portable horizontal silo or silos of the invention have the advantages that they may be easily moved to a site in a market area not served by an asphalt plant and may be more easily relocated than a prior art facility. The invention is also adaptable to a much wider range of capacity. Not only may silos be made in various sizes, but each size covers a range up to its maximum capacity. Thus, for example, a "normal" sized horizontal silo is adapted to operate efficiently with any amount from the smallest quantity up to 200 tons of asphalt material whereas the majority of portable vertical asphalt silos have a capacity of about 70 tons and are more efficient the closer they are to full capacity.

With the horizontal silo of this invention, greater flexibility and simplicity of operation is afforded, for example, in asphalt markets where many material use points are located far from asphalt plants and where it is most efficient to have the paving material moved to these use points over large distances in large maximum sized tractor-trailer haul units. These efficiencies are not possible to achieve in the prior art because, for example, the large trucks may not be allowed or are not adaptable to dispense their contents when they arrive, due to the respective facts that the large tractor-trailer truck makes it more difficult to accurately steer the paving machine and because some state laws outrightly disallow the use of these large tractor-trailers in certain applications. Hence higher cost, smaller trucks must be used to dump the materials directly into paving machines. Also, some job sites are too confined to accept the large tractor-trailer units because of overhanging tree limbs and wires. By contrast, the horizontal surge/storage silo of the invention allows the large over-the-road tractor-trailer trucks to do what they do best in long distance high speed transport of materials to a site whereat they may quickly dump the materials in a matter of a few minutes and return for further work. On the material dump site in the horizontal silo an end loader may be used to load the material onto small dump trucks that are more suitable for delivery to and use with the paving machine. This arrangement thus reduces the criticality of timing the arrival of large truck loads and avoids tying up their drivers' and operators' waiting to dump and return.

Another advantage for this highly portable horizontal silo is that it serves to substantially extend and regulate the work period for the crews requiring the materials. Thus, in places with high traffic congestion where, for example, the large tractor-trailer haul units are prohibited from departing an asphalt plant during rush hours because of the extra congestion and delays encountered, the limited schedule and uncertain delivery may reduce the amount of work that can be done each day by material user crews and/or extend job completion to produce higher costs due to likely overtime costs and uncertain work schedules.

In the waste management industry, the collection and transportation of waste material to its final resting site is rather the reverse process of the one described in the asphalt paving industry. Generally speaking, in the prior art, small to medium sized capacity units collect waste material from the site of generation and sometimes unload the contents at a fixed and relatively expensive transfer site. Once at the transfer site, the garbage is reloaded into maximum capacity tractor-trailer haul units for transport, sometimes hundreds of miles, to the final disposal site.

With the present invention, the highly portable silos may be moved to or utilized at the most convenient location possible on a given date for a relatively short period of time as for example, in the order of a few hours, so as to coincide with the actual collection time of refuse or waste material from the sources in the area. This more convenient and central location reduces the distance collector trucks must travel with smaller "dumpster" units. As the load patterns at the collection points change, the location of the portable silo may be changed to keep it as convenient as possible. The silo also has the advantage that it may be used as a transfer station and/or to actually haul the collected waste over the road to a dump site.

An additional benefit of this invention is that it may be temporarily located without the necessity of obtaining zoning or occupancy permits. Also, units equipped with a fast closing entrance door and roof which totally seals the unit serves to overcome any possible sanitary or odor problems and prevents access by children to contents such as toxic wastes, for example. Collection of any possible run-off liquids may also be provided. A heavy steel construction totally eliminates any problem of encroachment and carry-off caused by animals and rodents as tends to occur with garbage at current type transfer stations.

Other uses of the invention are as a very convenient and secure material and equipment storage facility at a construction site for example. It may also serve as a work area and when made with walls insulated against heat or sound transfer provides a convenient working area at a site. Other advantages and aspects of the invention will become apparent upon making reference to the following specification, claims, and drawings.

DESCRIPTION OF THE DRAWINGS

FIG. 1 is an elevational view of an embodiment of the portable horizontal silo in an operational position on the ground;

FIG. 2 is a plan view of the silo in FIG. 1.

DETAILED DESCRIPTION OF THE INVENTION

Figure 3:
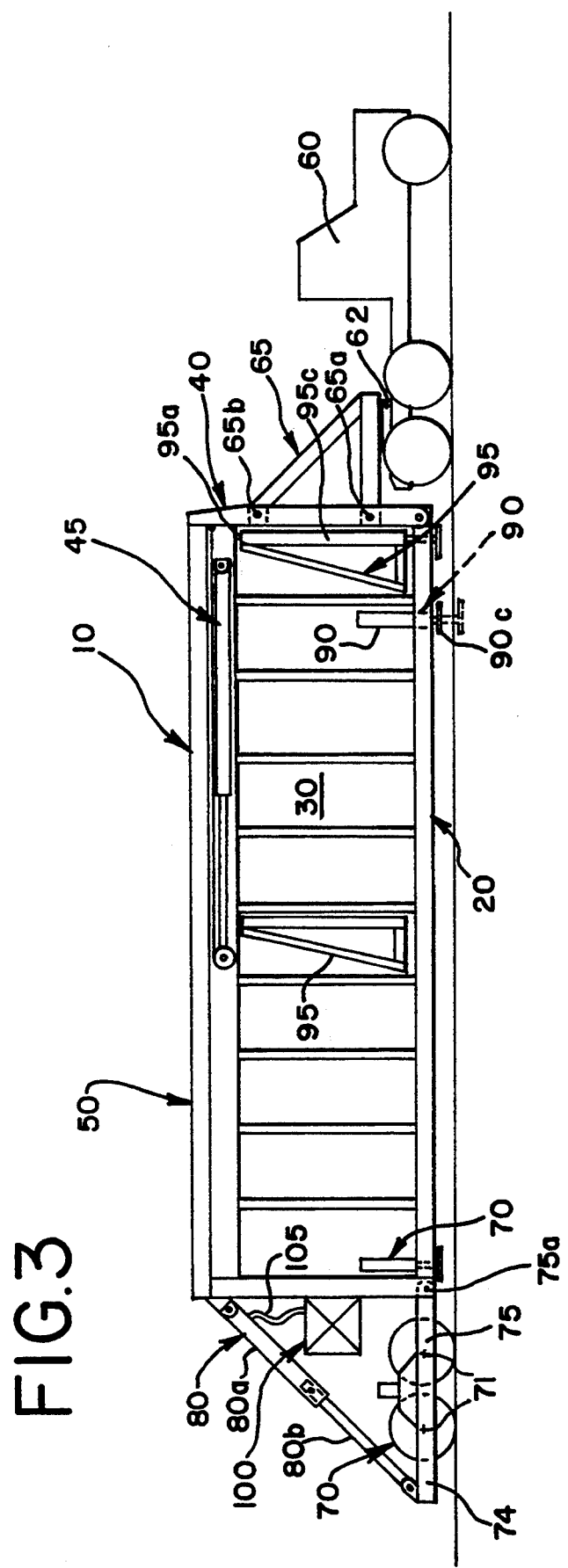
FIG. 3 is an elevational view of the horizontal silo of FIG. 1 and 2 in transit between locations; and, FIG. 4 is an elevational end view as seen from the left side.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

According to the embodiment of the invention as shown in FIG. 1, there may be seen a portable, generally horizontal silo generally indicated at 10 for handling and processing of various types of materials including a generally horizontally disposed base means 20. The base means 20 has a lower or bottom surface 20b adapted to be positioned generally on a base receiving area 5 on the earth. This area 5 may be ground, gravel, concrete, stone, etc. An upper surface 20a of the base means 20 is generally planar and adapted to receive large and small type trucks thereon and to support multiple truckload quantities of materials as well as equipment for handling the materials.

The base means 20 has a sidewall means 30 upstanding generally from the periphery of the base 20 to form an enclosure adapted to hold the material. The sidewall means 30 has an access means 40 therein to allow access to the base means 20 by large and small types of trucks and equipment whereby said material may be delivered to said silo by one type of truck and taken away by the other type of truck.

The base means 20 may be constructed of high-strength steel welded together to provide a suitably strong structure to accommodate the trucks, equipment and designed contents with a satisfactory margin of safety. The base means 20 is of suitably strong construction to rest either fully or partially on the ground surface 5 in the receiving area.

High strength construction of the base means 20 allows the structure to function as an over-the-road trailer as will be described in greater detail hereafter.

The upstanding sidewall means 30 may comprise sides 32, 34 and 36 as may be best seen in FIG. 2 and include an access means 40. In the preferred embodiment, the sidewalls are of a high-strength steel construction integrally welded to the base means 20 and upstanding to the same predetermined height. Suitable reinforcing means in the sidewall as shown at 30a and 30b and along the top edge as shown at 30c may be formed therein to provide the necessary structural strength and integrity for the structure to perform the designed function. The embodiment illustrated has a capacity of about 200 tons and in that embodiment the base means has interior dimensions of 12×40 with a height of approximately 12' from the bottom to top edge. As is shown, the base and sidewalls are approximately 1' thick.

The access means 40 is generally pivotally connected along its base 40a to the base means 20 along an edge 20c of the base by suitable hinge means so that when the access door means 40 is in its open position as shown in FIG. 1 the transition from the top surface 40a of the door means 40 will be smooth to the inner surface 20a of the base. Thus, the means 40 pivots about a suitable connector 44 in moving from between a first position shown in dotted lines in FIG. 1 wherein it is upstanding to close and complete the peripheral sidewall 30 to a second position shown in solid lines wherein its upstanding outside surface 40b rests on the ground and provides an access ramp to facilitate entry into and exit from the silo means 10.

The door means 40 is operable by a quick open and close means such as shown in FIG. 1, for example, at 45 comprising a hydraulic cylinder 45a pivotly connected to an upper portion of the sidewall 30 at 45b and having a hydraulic piston 45c mounted therein for axial movement within said cylinder 45a. A pulley 45d is rotatably mounted at the end of the piston 45c on axle means 45e. A wire means 45f has a first end suitably affixed to the cylinder 45b or sidewall 32 and passes over the pulley 45d and backwards over a second pulley 45g and has its other end attached to the door means 40 at a point 45h which is adjacent to the pulley 45g when the door means 40 is in its upright position. For best results an identical closure means 45 is mounted in the same mirror image position on the sidewall 36 so that both sides of the door means 40 are moved together.

The fast opening and closing of the door means 40 is particularly advantageous in situations where it must be closed to confine the contents as would be the case, for example, where it is desired to protect garbage against insects and rodents.

Where further enclosure is desirable or required, a roof means generally indicated at 50 may be provided as shown in FIGS. 1 and 2. The roof structure 50 is shown generally planar and attached to one side 36 of the horizontal silo means 10 along an upper edge 36a thereof. As shown, the means of attachment may be a pair of hinges 52 at opposite ends whereby the top cover means 50 may be pivoted between a first position where, as shown in FIG. 3, it contacts and effectively rests upon the upstanding sidewall means 36, 34 and 32 to effectively seal the interior of the silo 10, and a second position as shown in FIGS. 1 and 4 wherein it is upstanding from the upper edge 36a of the side 36.

In other embodiments not shown, the cover means roof means 50 may be folded down adjacent the side 36 or articulated in 2, 3 or 4 or more hinged sections which may be folded up accordion style and pivoted over along one side.

In any event, the roof closure means 50 may be operated by hydraulic means such as schematically illustrated in FIG. 4 at 54 wherein it may be shown to comprise the cylinder 54a pivotally connected to the end 54b and have axially mounted therein a piston 54c pivotally connected to the roof means 50 at 54d.

In accordance with an embodiment of the invention, the horizontal silo 10 may be moved from place to place by a tow means generally indicated at 60 and detachably connected thereto by means of a fifth wheel 62 attached to a gooseneck means generally indicated at 65. The gooseneck means may be detachably connected to the access means 40 on what would then be the front end of the horizontal silo 10. Attachment and detachment of the gooseneck 65 to the door means 40 may be affected by suitable conventional connector means generally indicated at 65a and 65b.

A wheel means schematically indicated at 70 positioned at the opposite end of the horizontal silo 10 is movable into and out of effective engagement with the ground 5 by means of a hydraulic lift means 80. When in a first position effectively in engagement with the ground, the wheel means 70 cooperates with the moving means 60 to allow the horizontal silo 10 to be moved on conventional roads as a conventional tractor trailer would be. The wheel means generally indicated at 70 may comprise a pair of tandem axles 71 each having four wheels and tires 72 thereon appropriately mounted with shock absorbing and other means to allow over-the-road travel at normal highway speeds. The axle 72 and other shock absorbing means are mounted on a frame generally indicated at 74 including a pair of members 75 having a first end pivotally connected at 75a to the base 20 of the silo and a second opposite end pivotally connected at 75b to one end of the hydraulic lift means 80. Again, the hydraulic lift means preferably includes a cylinder 80a bearing a piston 80b axially and slideably mounted therein with appropriate valving and seals so that fluids in the cylinder 80a control the extension of the piston 80b. The wheel means 70 are movable by means of the hydraulic lift means 80 between a first position as shown in FIG. 3 operatively engaging the ground to support the horizontal silo in a transportable position spaced from the ground and a second, operative position generally as shown in FIG. 1 wherein the wheel means 70 is effectively out of engagement with the ground 5 so that the base 20b of the horizontal silo 10 effectively rests on the ground 5.

Hydraulic units generally indicated at 90 are strategically located about the periphery of the base means 20 and function to lift or hold the silo structure means 10 above the ground as the wheel means 70 are raised or lowered. They also function to provide a level adjustment means while the silo 10 is adjusted to the specific terrain. Each hydraulic unit 90 includes a cylinder 90a connected to the silo means 10 and having a piston 90b with a foot pad 90c thereon whereby as fluids are pumped into the cylinder the piston is caused to extend and lift the silo. Conversely, the opposite function occurs when the silo is to be lowered. In addition to the hydraulic unit means 90, a further outrigger hydraulic means shown at 95 particularly in FIGS. 2 and 3 may be included to provide additional lateral support to the silo which is particularly advantageous when the unit is used under high capacity and high load conditions. The outrigger units 95 are generally A shaped frames having one side pivotally connected at 95a, 95b to upstanding sidewalls 32, 36 of the silo. Each frame includes a hydraulic cylinder 95c, piston 95d and ground engaging pad 95e which are adapted to be used by swinging them out around pivot means 95a and 95b from a first position as shown in FIG. 3 tucked against the silo sidewalls to a second position as may be seen in FIGS. 1 and 2 where they are at generally right angles to the sidewalls and serve to stabilize the silo.

All of the hydraulics including the access door means 40, roof means 50, wheel means 70 and supports 90, 95 may be driven off of a self-contained gasoline powered hydraulic unit 100 connected thereto by suitable hydraulic hose schematically indicated at 105. In the illustrated embodiment of a 200 ton capacity horizontal silo, the overall width of the silo 10 would be 14' for example and the interior dimension of the base means 20 would be 12×40'. Overall length including the rear wheel means 70 and the tractor means 60 would be about 75–80'. The base 20 of the silo may be positioned on a generally level, generally planar area of ground 5 whereby the weight of the contents will be effectively supported directly on the ground. However, it may be advantageous in certain circumstances to position the base 20 on a slight grade to facilitate material handling and liquid drainage.

As is set forth above, the invention provides a base means 20 adaptable to be accessible to a first type of truck not shown having a large capacity generally long distance hauling capability as well as a second type of truck also not shown having a smaller capacity and generally local hauling capability. The base means 20 is of a size to store multiple truck load loads of material and to provide room for a material handling device generally indicated at 120 in FIG. 2 having a front end loading scoop 120a.

The foregoing structure makes possible a method of efficiently handling the movement of the materials between a relatively long distance remote site and a generally local site comprising the steps of moving the portable horizontal storage/surge silo into a position near the local site, using one type of truck to deliver materials to the horizontal silo and a second type of truck to remove materials from the silo and using a movable self-propelled material handling device such as the front end loader 120 in the silo to arrange the material and load it onto the trucks for removal.

This generic method is susceptible to a wide range of adaptations. For example, in one use in connection with asphalt materials, large long distance hauling trucks may be used to rapidly bring large quantities of asphalt materials from a remote site to the horizontal silo at which point they may back up and quickly dump their contents for subsequent restacking and/or reloading by material handling means 120 onto other smaller vehicles for paving use. The horizontal silo is particularly efficient in that it allows the large trucks to be used over long distances and the smaller trucks to be used in connection with the paving machine. This is particularly advantageous where the paving machine is not effectively operable with the large trailer trucks, and in those states where the laws outrightly disallow the use of these larger trailers in certain applications. Also, in situations where there are overhanging wires or limbs or the street would be susceptible to damage by the larger trucks, the horizontal silo answers a long felt need in the art. Also, with this arrangement the criticality of timing the arrival of large truck loads is avoided and the work schedules of the users of the material may be easily regulated with a constant and reliable source of paving materials.

In the handling of waste materials the process may be just the opposite in that the smaller trucks may be used to effect local pickups of dumpsters and deposit the contents in the horizontal silo for subsequent reloading onto larger, over-the-road trailers that are more adaptable to longer distance and higher capacity hauling. This also provides the advantage that silos may be moved to or utilized at the most convenient location possible to effect the most efficient collection at any point in time. The fast closing entrance door 40 and a roof 50 totally seals the unit 10 against problems with rodents or insects or odor problems. Also, the horizontal silo of the invention 10 may be temporarily located without the necessity of obtaining zoning or occupancy permits since its presence may be limited to a few hours during dependency of the operation or as required.

Further protection against any possible contamination of the environment may be provided by self-contained means for the storage of any fluids which may occur in the materials and tend to run off. This run off may be drainable into closed storage tanks not shown constructed in the bottom of the silo and easily accessible by standard pump-out means as required.

Other uses of the invention include as a secure material and equipment storage facility at a construction site for example whereby the unit may be opened up each morning to allow access to materials and equipment and quickly closed in a matter of minutes at the end of the day to protect against theft and vandalism of the valuable construction materials.

In a further embodiment of the invention the horizontal silo unit can be fully insulated to provide for insulated storage. Further, such structures may be equipped with suitable heating or cooling means and they may provide very effective local storage.

Other ancillary functions may be included with the unit. Thus, for example, where used for collecting garbage, the horizontal silo 10 may include means for any one or more of the following operations, e.g. classifying, separating, shredding, recycling, dissolving and compacting materials. With this arrangement the horizontal silo 10 may serve as a field classifying station whereby different materials may be removed therefrom by different vehicles to different destinations.

Of course, the invention is adaptable to be embodied in different sized units ranging from a minimum number of truckloads to over 200 tons of materials such as would be the case with asphalt. The adequate size and generous inside width of up to 14' may easily allow any type of dump truck, garbage truck or other material handling device to simply back into the horizontal silo and dump the hauled contents onto the surface 20a of the base. With the material in place, a large, high capacity front end loader 120 may be utilized primarily to reload the contents of the horizontal silo 10 into haul units and to restack the contents thereby increasing its effective capacity.

The simple construction of the horizontal silo 10 according to the invention requires no footings, no electrical services or other outside utilities and requires only minutes to become operational after arrival on the usage site. The portable rectangular trailer-shaped embodiment of the horizontal silo 10 may be quickly and easily moved from site to site as required. A rather basic construction allows it to be manufactured for a small fraction of the cost of an equivalent vertical silo. Moreover, it avoids the mechanical vertical loading devices used with the traditional vertical silo systems thereby reducing the primary acquisition costs approximately 60% and more importantly reducing the maintenance costs approximately 90% because the vertical conveyor is a high maintenance item.

Operation also is simple. Thus, a standard truck tractor may haul the horizontal silo 10 to the place of utilization. The hydraulic supporting units 90, 95 may then be placed on any soil or other surface capable of supporting them. With the self-contained hydraulic package and the hydraulic cylinders, one person can easily disconnect the towing tractor, lower the supports 90, raise the wheel means 70 and lower the device to a point where the frame and door system contact the surface of the ground 5 which may be bare ground or a parking lot or street. The roof means 50 may be hydraulically opened at this point. Sidewall braces such as indicated at 95 are positioned and the gooseneck assembly 65 is removed and the door means 40 opened so that unit 10 is now ready to accept the contents of the trucks. The trucks may be easily backed inside of the device to dump or discharge their contents onto the top surface of the base 20a. After loads have been dumped, a front end loader such as 120 may be utilized to rearrange the contents and load them into another unit.

Manufacturing cost efficiencies are realized from the use of basic commercial items such as standard trailer axles, wheels, tires, bearings, shock absorbers, gasoline engines, self-contained hydraulic units, plate steel, structural steel, hydraulic tubing and connections, wiring controls, etc.

Standard seal and locking means may be employed on the roof means of the units whereby they are effectively impermeable against permeation by air, moisture, heat and sound. The sound insulating factor may be very important in residential construction sites where the horizontal silo affectively acts as a sound barrier against the noises from saws, drills and grinders, etc. typically used by tradesmen. Where access is more frequent by tradesmen and less frequent by large delivery trucks, it is within the contemplation of this inventor to also provide additional doors for people. Other adaptations contemplated by the invention include the use of interior environmental conditioning means such as heaters, coolers, filters, windows, skylights, ventilators.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details.

I claim:

1. A portable horizontal storage/surge silo for efficiently handling and transporting materials between a remote site and a local site comprising:
    a base adapted to be accessible to a first truck having a large capacity and long distance hauling capability and a second truck having a smaller capacity and local hauling capability, said base capable of storing multiple truckload capacities of asphalt, pallets, waste, garbage, refuse and/or the first and second trucks;
    sidewalls for forming an enclosure adapted to contain said asphalt, pallets, waste, garbage, refuse and/or said first and second trucks;
    an access door for allowing said first and second trucks to have access to the enclosure;
    a roof for forming the enclosure;
    a third truck for towing the portable horizontal storage/surge silo between the remote and local sites;
    a means for attaching the third truck to the enclosure;
    a retractable wheel assembly for facilitating transportation of the enclosure; and
    a means for hydraulically adjusting a level and orientation of the entire base to provide additional lateral support to the silo.

2. The portable storage/surge silo according to claim 1, wherein said access door is pivotally connected to said base providing an access ramp outside the base to facilitate entry into and exit from said silo.

3. The portable storage/surge silo according to claim 2 wherein the roof is pivotally connected to a portion of said upstanding sidewall and is capable of opening and sealing the enclosure.

4. The portable storage/surge silo according to claim 3 wherein said access door and said roof are moved and operated by hydraulic cylinders, wherein said portable silo further includes a hydraulic pressure generating means therewith to operate said hydraulic means and wherein utilities outside the silo are not required.

5. The portable storage/surge silo according to claim 3 wherein said base, sidewalls and roof effectively insulate heat, moisture and sound from the enclosure.

6. The portable storage/surge silo according to claims 5 wherein said silo further includes a means for conditioning air within the enclosure.

7. The portable storage/surge silo, according to claim 1, wherein said means for hydraulically adjusting includes at least three pivotably connected, hydraulic outrigger structures which are positioned on or about a periphery of said base and are capable of lifting at least an empty weight of said portable silo.

8. The portable storage/surge silo according to claims 1 or 3 wherein said retractable wheel assembly is capable of operatively engaging a ground to support said portable silo in a transport position above the ground and operatively disengaging the ground.

9. The portable storage/surge silo according to claim 8 wherein said retractable wheel assembly is retracted by hydraulic cylinders.

10. The portable storage/surge silo according to claim 8 wherein said base is rectangular having first and second long and short sides and wherein said retractable wheel assembly is located adjacent to the first short side and said access door is located on the second short side of said base.

11. The portable storage/surge silo according to claim 1 wherein a minimum width between first and second long sides is at least twelve feet to accommodate first truck therein.

12. A method of efficiently handling and transporting materials between a remote site and a local site comprising the steps of:
   providing a portable horizontal storage/surge silo having
   a base adaptable to be accessible to a first truck having a large capacity and long distance hauling capability and a second truck having a smaller capacity and local hauling capability, said base Capable of storing multiple truckload capacities of asphalt, pallets, waste, garbage, refuse and the first and second trucks;
   sidewalls for forming an enclosure adapted to contain said asphalt, pallets, waste, garbage, refuse and/or the first and second trucks;
   an access door for allowing the first and second trucks to have access to the enclosure;
   a roof for forming the enclosure;
   a third truck for towing the portable horizontal, storage/surge silo between the remote and local sites;
   a means for attaching the third truck to the enclosure;
   a retractable wheel assembly for facilitating transportation of the enclosure; and,
   a means for hydraulically adjusting a level and orientation of the entire base to provide additional lateral support to the silo;
   transporting said portable horizontal storage/surge silo to said local or remote site by the third truck;
   optionally, delivering said asphalt, pallets, waste, garbage, and/or refuse to said portable silo by the first truck;
   optionally, removing said asphalt, pallets, waste, garbage, and/or refuse from said portable silo by the second truck; and
   optionally, handling said asphalt, pallets, waste, garbage, and/or refuse within said silo by the second truck.

13. The method of efficiently handling and transporting material according to claim 12 further including the steps of:
   hydraulically adjusting the level and orientation of the entire base by the hydraulically adjusting means to provide additional lateral support to the silo; and,
   hydraulically retracting the retractable wheel assembly.

14. The method of claim 13 further including the steps of:
   hydraulically operating the access door to allow access by said first and second trucks;
   hydraulically operating the roof; and,
   optionally, detaching the third truck from the enclosure.

* * * * *

UNITED STATES PATENT AND TRADEMARK OFFICE
CERTIFICATE OF CORRECTION

PATENT NO. : 5,427,497
DATED : June 27, 1995
INVENTOR(S) : Bruce A. Dillman

It is certified that error appears in the above-indentified patent and that said Letters Patent is hereby corrected as shown below:

Claim 12, column 11, line 22, delete "Capable" and insert --capable--.

Signed and Sealed this

Seventh Day of November, 1995

Attest:

BRUCE LEHMAN

*Attesting Officer*     *Commissioner of Patents and Trademarks*